United States Patent
An et al.

(10) Patent No.: US 10,700,396 B2
(45) Date of Patent: Jun. 30, 2020

(54) HEAT SINK AND BATTERY MODULE INCLUDING THE SAME

(71) Applicant: LG CHEM, LTD., Seoul (KR)

(72) Inventors: Hyuk An, Daejeon (KR); Jun-Kyu Park, Daejeon (KR); Gang-U Lee, Daejeon (KR); Jun-Yeob Seong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 181 days.

(21) Appl. No.: 15/574,759

(22) PCT Filed: Nov. 14, 2016

(86) PCT No.: PCT/KR2016/013088
§ 371 (c)(1),
(2) Date: Nov. 16, 2017

(87) PCT Pub. No.: WO2017/086664
PCT Pub. Date: May 26, 2017

(65) Prior Publication Data
US 2018/0151927 A1 May 31, 2018

(30) Foreign Application Priority Data
Nov. 20, 2015 (KR) .................. 10-2015-0163174

(51) Int. Cl.
- *H01M 8/04* (2016.01)
- *H01M 10/656* (2014.01)
- *H01M 10/6552* (2014.01)
- *H01M 10/613* (2014.01)

(Continued)

(52) U.S. Cl.
CPC ....... *H01M 10/656* (2015.04); *H01M 2/1016* (2013.01); *H01M 2/1077* (2013.01);
(Continued)

(58) Field of Classification Search
CPC ............ H01M 10/656; H01M 10/613; H01M 10/6552; H01M 10/6554; H01M 10/6556;
(Continued)

(56) References Cited

U.S. PATENT DOCUMENTS

| | | |
|---|---|---|
| 2009/0165996 A1 | 7/2009 | Lynch |
| 2009/0214940 A1 | 8/2009 | Haussmann |

(Continued)

FOREIGN PATENT DOCUMENTS

| | | |
|---|---|---|
| CN | 201146231 Y | 11/2008 |
| CN | 203604166 U | 5/2014 |

(Continued)

OTHER PUBLICATIONS

International Search Report for PCT/KR2016/013088 (PCT/ISA/210) dated Feb. 28, 2017.

*Primary Examiner* — Raymond Alejandro
(74) *Attorney, Agent, or Firm* — Birch, Stewart, Kolasch & Birch, LLP

(57) ABSTRACT

Disclosed is a heat sink having improved space utilization and a battery module including the same. The heat sink for cooling a cell assembly including at least one unit cell comprises a first heat sink coupled to one side of the cell assembly and having a first cooling channel through which a coolant passes, and a second heat sink coupled to the other side of the cell assembly and having a second cooling channel through which the coolant passes. Since heat sinks are coupled to both sides of a cell assembly, a Z-axial space of a battery pack may be ensured without increasing the height of the battery pack.

8 Claims, 4 Drawing Sheets

(51) Int. Cl.
*H01M 10/6556* (2014.01)
*H01M 10/6568* (2014.01)
*H01M 2/10* (2006.01)
*H01M 10/6554* (2014.01)

(52) U.S. Cl.
CPC ..... *H01M 10/613* (2015.04); *H01M 10/6552* (2015.04); *H01M 10/6554* (2015.04); *H01M 10/6556* (2015.04); *H01M 10/6568* (2015.04)

(58) Field of Classification Search
CPC ........... H01M 10/6568; H01M 2/1016; H01M 2/1077
See application file for complete search history.

(56) References Cited

U.S. PATENT DOCUMENTS

| | | | |
|---|---|---|---|
| 2010/0055553 A1* | 3/2010 | Kimura | B60K 1/04 429/120 |
| 2012/0148889 A1* | 6/2012 | Fuhr | H01M 2/1077 429/87 |
| 2012/0183823 A1 | 7/2012 | Von Borck et al. | |
| 2014/0248515 A1 | 9/2014 | Wayne et al. | |
| 2015/0140388 A1 | 5/2015 | Harada et al. | |
| 2015/0325889 A1 | 11/2015 | Jung et al. | |
| 2016/0036102 A1 | 2/2016 | Suzuki et al. | |

FOREIGN PATENT DOCUMENTS

| | | |
|---|---|---|
| CN | 203950871 U | 11/2014 |
| JP | 2009-193961 A | 8/2009 |
| JP | 2013-37869 A | 2/2013 |
| KR | 10-2013-0005004 A | 1/2013 |
| KR | 10-2013-0008142 A | 1/2013 |
| KR | 10-2013-0064969 A | 6/2013 |
| KR | 10-2014-0084487 A | 7/2014 |
| KR | 10-2015-0045378 A | 4/2015 |
| TW | 200938069 A | 9/2009 |
| WO | WO 2014/155609 A1 | 10/2014 |

* cited by examiner

HEAT SINK AND BATTERY MODULE INCLUDING THE SAME

TECHNICAL FIELD

The present application claims priority to Korean Patent Application No. 10-2015-0163174 filed on Nov. 20, 2015 in the Republic of Korea, the disclosures of which are incorporated herein by reference.

The present disclosure relates to a heat sink having improved space utilization and a battery module including the same.

BACKGROUND ART

A secondary battery which has ease with applicability for various product groups and good electric characteristics such as high energy density is universally applied not only to portable devices but also electric vehicles (EV), hybrid electric vehicles (HEV), energy storage systems or the like, which are driven by an electric source. The secondary battery has a primary advantage of greatly reducing the use of fossil fuels and a secondary advantage of generating no byproduct after the use of energy, and thus the secondary battery receives attention as a new energy source which is environment-friendly and promotes energy efficiency.

A battery pack applied to an electric vehicle or the like includes a plurality of cell assembly connected in series, each cell assembly having a plurality of unit cells, in order to obtain high output. In addition, the unit cell includes positive and negative electrode current collectors, a separator, active materials, an electrolyte or the like and is capable of being repeatedly charged and discharged by means of electrochemical reactions among the components.

Meanwhile, recently, as the necessity for a large-capacity structure to be utilized as an energy storage is increasing, the demand for a battery pack having a multi-module structure in which a plurality of modules are aggregated is also increasing.

In the battery pack of a multi-module structure, a plurality of secondary batteries is densely arranged in a narrow space, and thus it is important to easily emit heat generated from each battery module.

In order to cool the battery pack, an indirect water-cooling method is used.

The indirect water-cooling method is used for preventing a battery module from generating heat by using a heat sink with a cooling channel, and in general case, a single heat sink is coupled to a lower end of the battery module to absorb heat of the battery module.

FIGS. 1 and 2 are diagrams showing an existing heat sink applied for the indirect water-cooling method.

Referring to FIGS. 1 and 2, the existing heat sink 1 is coupled to a lower surface of a cell assembly 2 to cool the cell assembly 2. A cooling channel is formed in the heat sink 1, and a coolant inflow tube 3 and a coolant outlet tube 4 are also formed thereat. If a coolant flows into the coolant inflow tube 3, the coolant circulates along the cooling channel formed in the heat sink 1 to cool the cell assembly 2 and flows out through the coolant outlet tube 4.

However, the existing heat sink using the indirect water-cooling method has a problem in that its structure increases the entire height of a battery pack. In other words, since the upper surface of the existing heat sink 1 is closely coupled to a lower surface of the cell assembly 2, the entire height of the battery pack increases.

In addition, if the upper surface of the heat sink 1 is coupled to the lower surface of the cell assembly 2, a differential pressure increases at the coolant inflow tube 3 and the coolant outlet tube 4. In detail, since the heat sink 1 is closely coupled to the lower surface of the cell assembly 2, the coolant inflow tube 3 and the coolant outlet tube 4 are respectively bent twice, and due to such a bending structure, a differential pressure increases at the bent portions. In other words, the coolant inflow tube 3 and the coolant outlet tube 4 are firstly bent from a vertical direction to a horizontal direction and then secondly bent from the horizontal direction to the vertical direction, and due to such several bent portions, a differential pressure increases at the coolant inflow tube 3 and the coolant outlet tube 4.

DISCLOSURE

Technical Problem

The present disclosure is designed to solve the problems of the related art, and therefore the present disclosure is directed to providing a heat sin which may have improved space utilization, and a battery module including the same.

In addition, the present disclosure is also directed to providing a heat sink which may have a reduced differential pressure by minimizing bending of a coolant inflow tube and a coolant outlet tube, and a battery module including the same.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a heat sink for cooling a cell assembly including at least one unit cell, the heat sink comprising: a first heat sink coupled to one side of the cell assembly and having a first cooling channel through which a coolant passes; and a second heat sink coupled to the other side of the cell assembly and having a second cooling channel through which the coolant passes.

The second heat sink may include a coolant inflow tube connected to one end of the second cooling channel, and the first heat sink may include a coolant outlet tube connected to one end of the first cooling channel. The other end of the second cooling channel may be connected to a coolant connection tube, and the other end of the first cooling channel may be connected to the coolant connection tube.

A second connection port may be formed at the other end of the second cooling channel so that the other end of the second cooling channel is connected to the coolant connection tube through the second connection port.

Also, a first connection port may be formed at the other end of the first cooling channel so that the other end of the first cooling channel is connected to the coolant connection tube through the first connection port.

The coolant flowing in through the coolant inflow tube may pass through the second cooling channel, the coolant connection tube and the first cooling channel, and then flow out through the coolant outlet tube.

The coolant inflow tube and the coolant outlet tube may be bent downwards, so that a coolant inlet and a coolant outlet are formed at adjacent locations.

In an embodiment, the coolant outlet tube may extend horizontally toward the second heat sink and be bent downwards at a point adjacent to the second heat sink.

In another embodiment, the coolant inflow tube may extend horizontally toward the first heat sink and be bent downwards at a point adjacent to the first heat sink.

Advantageous Effects

In the present disclosure, since heat sinks are coupled to both sides of a cell assembly, a Z-axial space of a battery pack may be ensured without increasing the height of the battery pack.

In particular, in the present disclosure, since a plurality of heat sinks is designed to commonly use a single coolant inflow tube and a single coolant outlet tube, it is possible to further enhance space utilization of the battery module and reduce manufacture costs of the battery module.

In addition, in the present disclosure, since the cell assembly is cooled by means of a plurality of heat sinks installed at both sides thereof, it is possible to improve the cooling efficiency of the battery module in comparison to an existing indirect water-cooling method.

Further, in the present disclosure, since bending of the coolant inflow tube and the coolant outlet tube is minimized, it is possible to reduce a differential pressure occurring in the coolant inflow tube and the coolant outlet tube.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

BEST MODE

The above objects, features and advantages of the present disclosure will become apparent from the following descriptions of the embodiments with reference to the accompanying drawings, from which it will be deemed that a person having ordinary skill can easily practice the technical features of the present disclosure. Also, any explanation of the prior art known to relate to the present disclosure may be omitted if it is regarded to render the subject matter of the present disclosure vague. Hereinafter, an embodiment of the present disclosure will be described in detail with reference to the accompanying drawings.

Figure 1:
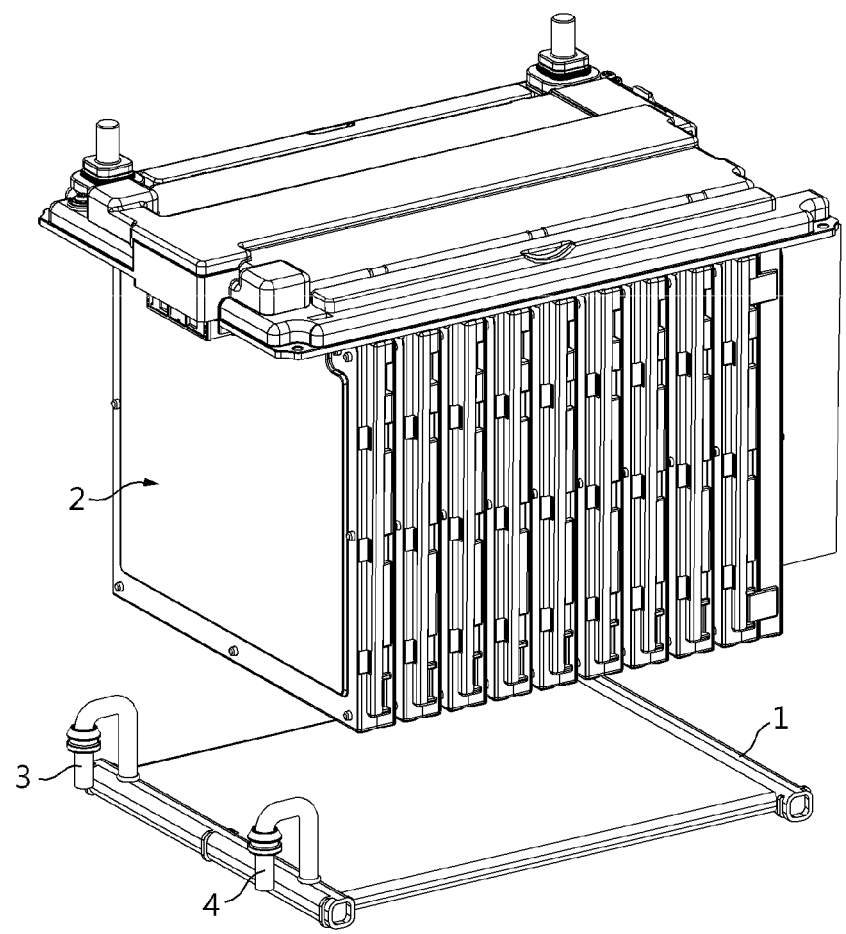
FIGS. 1 and 2 are diagrams showing an existing heat sink using an indirect water-cooling method.
Figure 2:
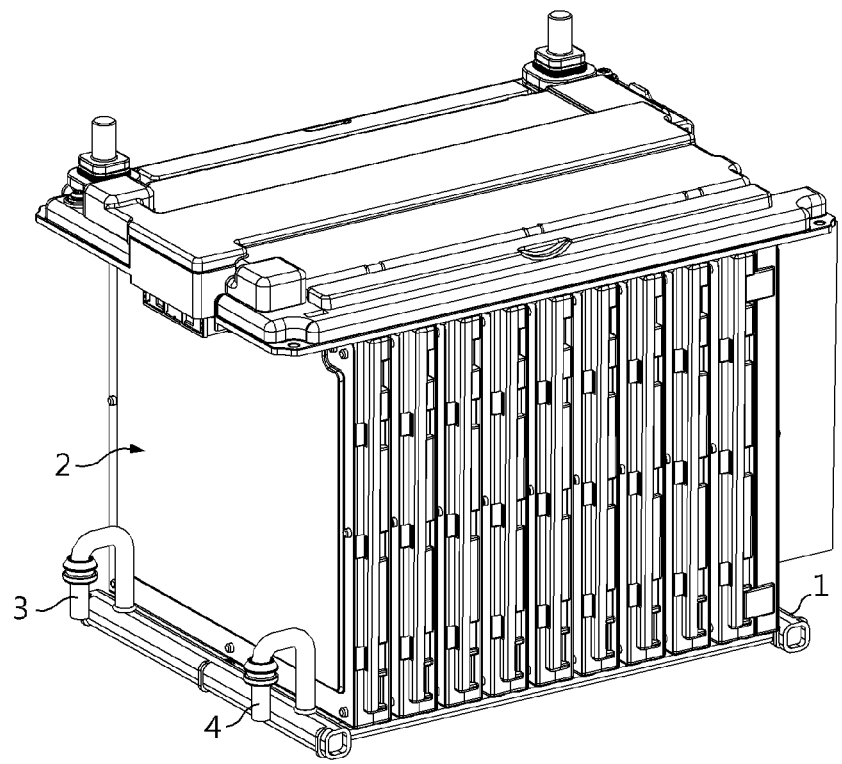
Figure 3:
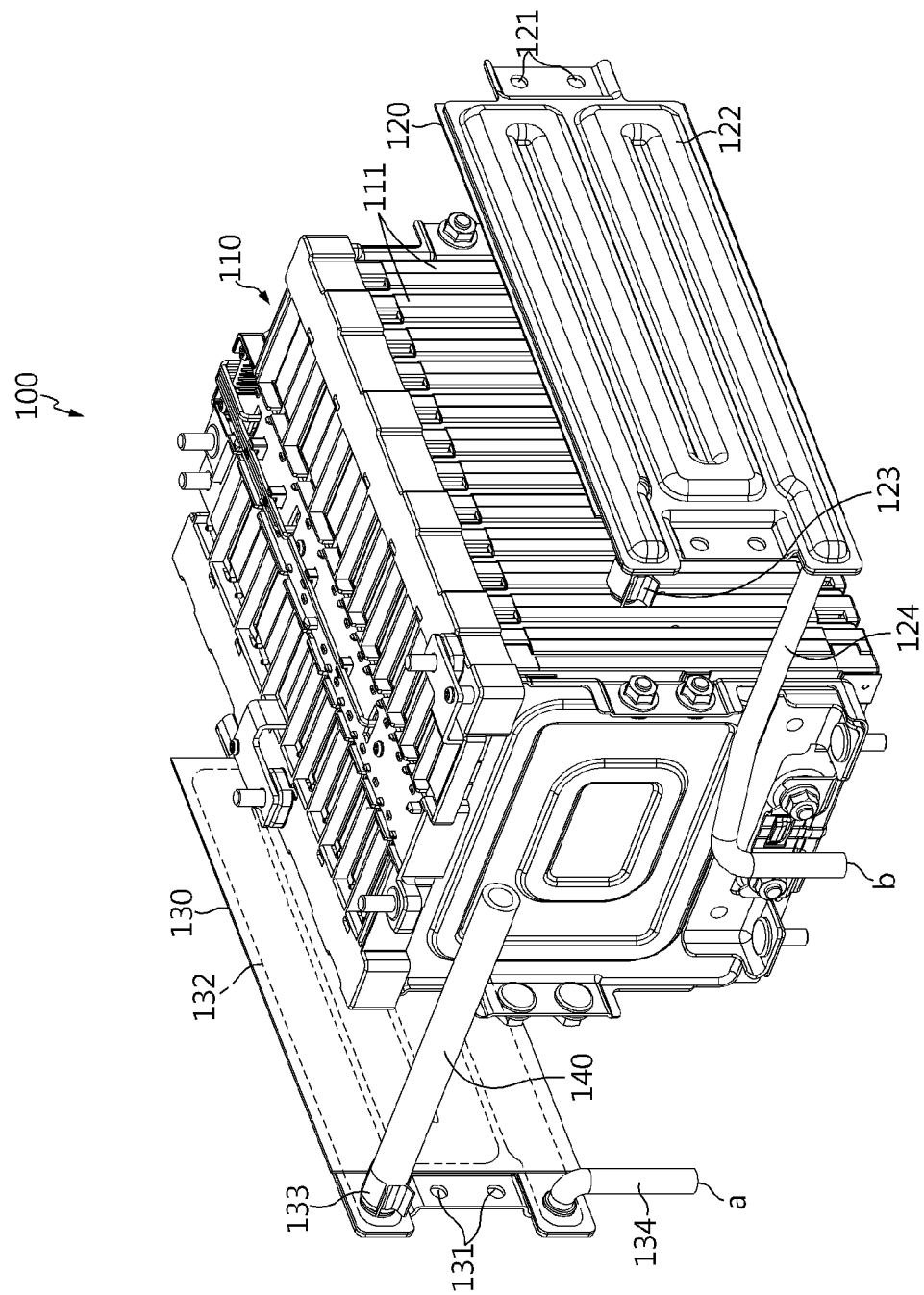
FIG. 3 is an exploded view showing a cell assembly and a heat sink according to an embodiment of the present disclosure.

FIG. 3 is an exploded view showing a cell assembly and a heat sink according to an embodiment of the present disclosure.

Figure 4:
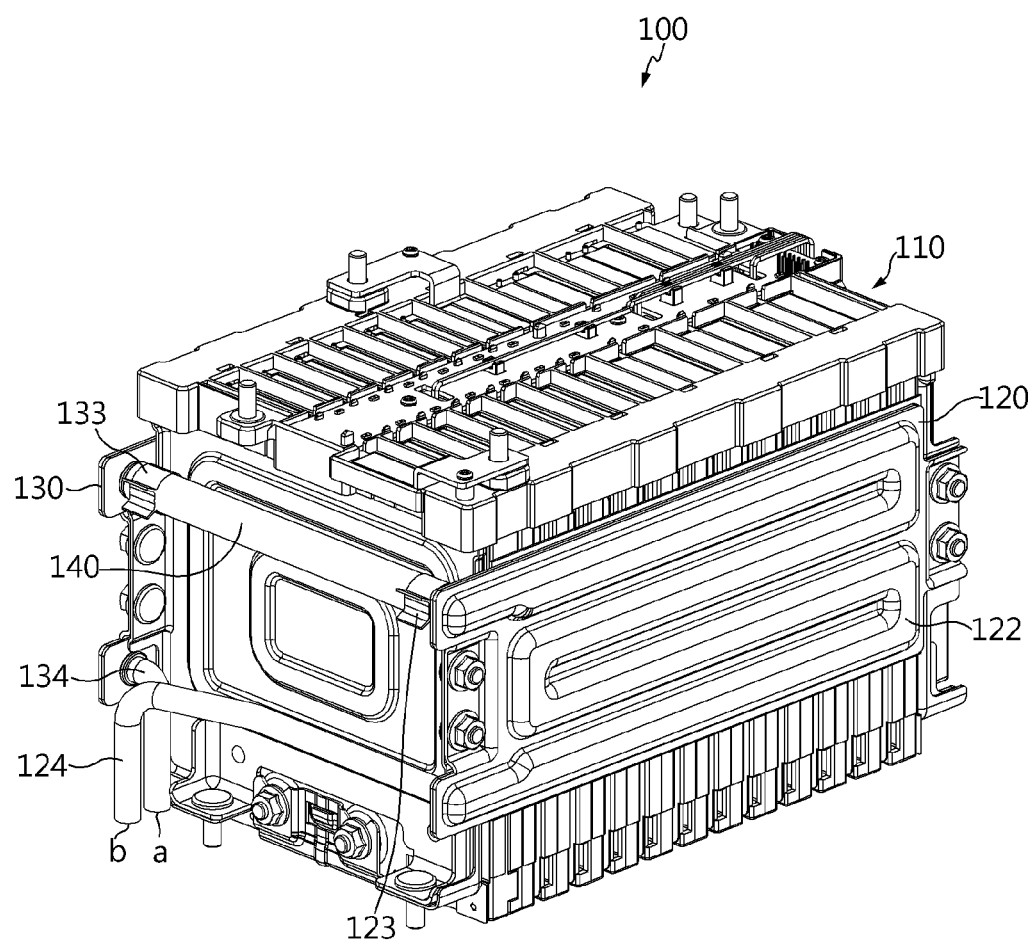
FIG. 4 is a diagram showing a battery module to which the cell assembly and the heat sink are coupled according to an embodiment of the present disclosure.

FIG. 4 is a diagram showing a battery module to which the cell assembly and the heat sink are coupled according to an embodiment of the present disclosure.

Referring to FIGS. 3 and 4, a battery module 100 according to the present disclosure includes a cell assembly 110 and a plurality of heat sinks 120, 130.

The cell assembly 110 is a module in which a plurality of unit cells 111 are stacked laterally and connected in series or in parallel, and electrode leads may be exposed at its sides.

The unit cell 111 is configured so that cells, each having a negative electrode plate, a separator and a positive electrode plate, are repeatedly stacked.

The cell assembly 110 includes at least one unit cell 111, and the kind of the unit cell is not specially limited. Each unit cell 111 may be configured with a lithium ion battery cell, a lithium polymer battery cell, a nickel cadmium battery cell, a nickel hydrogen battery cell, a nickel zinc battery cell or the like, which is rechargeable and also needs to consider a charge or discharge voltage. In addition, the number of unit cells 111 included in the cell assembly 110 may be set variously depending on a demanded output voltage or charge/discharge capacity. However, the present disclosure is not limited by the kind, output voltage, charge/discharge capacity or the lie of the unit cell 111. In addition, the present disclosure is not limited by an electric connection method of the unit cell 111.

Each of the heat sinks 120, 130 is used for cooling the cell assembly 110 in an indirect water-cooling method and is made of a material with excellent thermal conductivity (for example, aluminum or the like). Also, cooling channels 122, 132 serving as passages of the coolant are formed in the heat sinks 120, 130.

The cooling channels 122, 132 formed in each of the heat sinks 120, 130 may be shaped as shown in FIGS. 3 and 4 in the heat sinks 120, 130, or cooling channels 122, 132 of various shapes may also be formed in each of the heat sinks 120, 130. In addition, cooling channels of different shapes may be formed in the first heat sink 120 and the second heat sink 130.

A plurality of through holes 121 is formed in the first heat sink 120 so that a coupling member such as a bolt may be inserted therein, and if the coupling member is inserted into and coupled to the through hole 121, the first heat sink 120 is closely coupled to one side of the cell assembly 110. The first heat sink 120 is coupled to one side of the cell assembly 110 to absorb and dissipate heat energy generated at the unit cell 111 of the cell assembly 110 by means of the coolant flowing through the cooling channel 122.

A coolant outlet tube 124 is formed at one end of the cooling channel 122 of the first heat sink 120, and a connection port 123 is formed at the other end of the cooling channel 122.

The coolant outlet tube 124 may be designed with a pipe shape of a predetermined length, and has a space therein so that the coolant may flow. One end of the coolant outlet tube 124 is connected to one end of the cooling channel 122, and a coolant outlet b is formed at the other end of the coolant outlet tube 124.

In addition, one end of the coolant outlet tube 124 may also be connected to one end of the cooling channel 122 by means of welding, coupling or the like. In addition, the coolant outlet tube 124 and the cooling channel 122 may also be integrally fabricated.

The connection port 123 formed at the other end of the cooling channel 122 of the first heat sink 120 is coupled to the coolant connection tube 140 by means of welding, coupling or the like, thereby forming a passage for the coolant between the cooling channel 122 and the coolant connection tube 140. The coolant transferred through the coolant connection tube 140 flows into the cooling channel 122 of the first heat sink 120.

The coolant outlet tube 124 extends horizontally toward the second heat sink 130, and is bent in a vertical direction at a point adjacent to the second heat sink 130 and then extends again, so that the coolant outlet b is adjacent to a coolant inlet a. Since the coolant outlet b and the coolant inlet a are located adjacent to each other, it is easier to control flowing-in and flowing-out of the coolant. In addition, since the coolant outlet tube 124 is bent once in a downward direction, the number of bending is reduced in comparison to an existing heat sink, and thus a differential pressure in the coolant outlet tube 124 is also reduced.

By means of the connection structure of the coolant outlet tube 124 and the cooling channel 122 of the first heat sink 120, the coolant circulating through the cooling channel 122 of the first heat sink 120 flows out through the coolant outlet tube 124.

Similarly, a plurality of through holes 131 is formed in the second heat sink 130 so that a coupling member such as a bolt may be inserted therein, and if the coupling member is inserted into and coupled to the through hole 131, the second heat sink 130 is closely coupled to the other side of the cell assembly 110. The first heat sink 120 is coupled to one side of the cell assembly 110, and the second heat sink 130 is coupled to the other side of the cell assembly 110, which is opposite to one side thereof, to absorb and dissipate heat energy generated at the unit cell 111 of the cell assembly 110 by means of the coolant flowing through the cooling channels 122, 132.

A coolant inflow tube 134 is formed at one end of the cooling channel 132 of the second heat sink 130, and a connection port 133 is formed at the other end of the cooling channel 132.

The coolant inflow tube 134 may be designed with a pipe shape of a predetermined length, and has a space therein so that the coolant may flow. One end of the coolant inflow tube 134 is coupled to one end of the cooling channel 132, and a coolant inlet a is formed at the other end of the coolant inflow tube 134. One end of the coolant inflow tube 134 may be connected to one end of the cooling channel 132 by means of welding, coupling or the like. In addition, the coolant inflow tube 134 and the cooling channel 132 may also be integrally fabricated.

The connection port 133 formed at the other end of the cooling channel 132 of the second heat sink 130 is coupled to the coolant connection tube 140 by means of welding, coupling or the like, thereby forming a passage for the coolant between the cooling channel 132 and the coolant connection tube 140 and also providing the coolant circulating through the cooling channel 132 to the coolant connection tube 140.

The coolant inflow tube 134 is bent into a vertical downward direction and extends so that the coolant inlet a is formed downwards. In particular, since the coolant inflow tube 134 is bent just once, the number of bending is reduced in comparison to an existing heat sink, and thus a differential pressure in the coolant outlet tube 134 is also reduced.

By means of the connection structure of the coolant inflow tube 134, the cooling channel 132 of the second heat sink 130 and the coolant connection tube 140, the coolant flowing in through the coolant inlet a passes through the cooling channel 132 of the second heat sink 130 and the coolant connection tube 140.

In addition, by means of the connection structure of the first heat sink 120, the second heat sink 130 and the coolant connection tube 140, the battery module 100 including a plurality of heat sinks 120, 130 has just a single coolant inlet a, a single coolant inflow tube 134, a single coolant outlet b and a single coolant outlet tube 124. In other words, a single coolant inlet a, a single coolant inflow tube 134, a single coolant outlet b and a single coolant outlet tube 124 are commonly used for the first heat sink 120 and the second heat sink 130.

The coolant flowing into the coolant inflow tube 134 absorbs heat of the unit cells 111 while passing through the cooling channel 132 of the second heat sink 130, the coolant connection tube 140, and the cooling channel 122 of the first heat sink 120, and then flows out through the coolant outlet tube 124.

Meanwhile, in the above embodiment, it has been described that the coolant outlet tube 124 extends horizontally toward the second heat sink 130 and is bent into a vertical downward direction at a point adjacent to the second heat sink 130 so that the coolant outlet b and the coolant inlet a are adjacent to each other. However, it is also possible that the coolant inflow tube 134 extends horizontally toward the first heat sink 120, and is bent into a vertical downward direction at a point adjacent to the first heat sink 120 and vertically extends downwards.

In other words, as another embodiment, the coolant outlet tube 124 may be directly bent into a vertical downward direction without extending horizontally, and also the coolant inflow tube 134 may extends horizontally toward first heat sink 120 and is bent into a vertical downward direction at a point adjacent to the first heat sink 120. In another embodiment, the coolant inlet and the coolant outlet may be located adjacent to the first heat sink 120. In still another embodiment, both the coolant outlet tube 124 and the coolant inflow tube 134 may extend horizontally and are then bent into a vertical downward direction at a specific point (for example, an intermediate point between the first heat sink and the second heat sink) and extends, so that the coolant inlet and the coolant outlet are located adjacent to each other.

The battery module 100 according to an embodiment of the present disclosure may be used as a component of a battery pack including a plurality of battery modules and a battery management system for controlling charge/discharge of the battery modules. The battery pack according to an embodiment of the present disclosure may be used as a component of a battery-driven system including the battery pack and a load which is supplied with power from the battery pack.

The battery-driven system may be an electric vehicle (EV), a hybrid electric vehicle (HEV), an electric bike (E-Bike), a power tool, an energy storage system, an uninterrupted power supply, a portable computer, a portable phone, a portable audio device, a portable video device or the like. The load may be a motor for giving a rotational force by the power supplied from the battery pack or a power conversion circuit for converting the power supplied from the battery pack into a power necessary to various circuit components.

As described above, in the battery module 100 according to an embodiment of the present disclosure, since the heat sinks 120, 130 are coupled to both sides of the cell assembly 110, a Z-axial space of a battery pack may be ensured without increasing the height of the battery pack. In addition, in the battery module 100 according to an embodiment of the present disclosure, since a plurality of heat sinks 120, 130 is designed to commonly use a single coolant inflow tube 134 and a single coolant outlet tube 124, it is possible to further enhance space utilization and reduce manufacture costs of the battery module. Moreover, since the cell assembly 110 of the battery module 100 is cooled by means of the plurality of heat sinks 120, 130 installed at both sides thereof, it is possible to improve the cooling efficiency in comparison to an existing indirect water-cooling method. Further, in the battery module 100, since bending of the coolant inflow tube 134 and the coolant outlet tube 124 is minimized, it is possible to reduce a differential pressure occurring in the coolant inflow tube 134 and the coolant outlet tube 124.

It should be understood by those skilled in the art that many adaptations, modifications and changes may be made to the present disclosure without departing from the technical aspects of the present disclosure, and the present disclosure described hereinabove is not limited by the disclosed embodiments and the accompanying drawings.

What is claimed is:

1. A heat sink for cooling a cell assembly including at least one unit cell, the heat sink comprising:
   a first heat sink coupled to one side of the cell assembly and having a first cooling channel through which a coolant passes, the first cooling channel having a first end and a second end;
   a second heat sink coupled to the other side of the cell assembly and having a second cooling channel through which the coolant passes, the second cooling channel having a first end and a second end; and
   a coolant connection tube connecting the second end of the second cooling channel to the first end of the first cooling channel,
   wherein the second heat sink includes a coolant inflow tube connected to the first end of the second cooling channel,
   wherein the first heat sink includes a coolant outlet tube connected to the second end of the first cooling channel,
   wherein a second connection port is formed at the second end of the second cooling channel so that the second end of the second cooling channel is connected to the coolant connection tube through the second connection port, and
   wherein a first connection port is formed at the first end of the first cooling channel so that the first end of the first cooling channel is connected to the coolant connection tube through the first connection port.

2. A heat sink for cooling a cell assembly including at least one unit cell, the heat sink comprising:
   a first heat sink coupled to one side of the cell assembly and having a first cooling channel through which a coolant passes, the first cooling channel having a first end and a second end;
   a second heat sink coupled to the other side of the cell assembly and having a second cooling channel through which the coolant passes, the second cooling channel having a first end and a second end; and
   a coolant connection tube connecting the second end of the second cooling channel to the first end of the first cooling channel,
   wherein the second heat sink includes a coolant inflow tube connected to the first end of the second cooling channel,
   wherein the first heat sink includes a coolant outlet tube connected to the second end of the first cooling channel, and
   wherein the coolant flowing in through the coolant inflow tube passes through the second cooling channel, the coolant connection tube and the first cooling channel, and then flows out through the coolant outlet tube.

3. A heat sink for cooling a cell assembly including at least one unit cell, the heat sink comprising:
   a first heat sink coupled to a first side of the cell assembly and having a first cooling channel through which a coolant passes, the first cooling channel having a first end and a second end;
   a second heat sink coupled to a second side of the cell assembly opposite the first side and having a second cooling channel through which the coolant passes, the second cooling channel having a first end and a second end; and
   a coolant connection tube connecting the second end of the second cooling channel to the first end of the first cooling channel such that coolant first passes through the second cooling channel, then the coolant connection tube, and finally the first cooling channel.

4. The heat sink according to claim 1,
   wherein the second heat sink includes a coolant inflow tube connected to the first end of the second cooling channel, and
   wherein the first heat sink includes a coolant outlet tube connected to the second end of the first cooling channel.

5. The heat sink according to claim 4,
   wherein the coolant inflow tube and the coolant outlet tube are bent downwards, so that a coolant inlet and a coolant outlet are formed at adjacent locations.

6. The heat sink according to claim 5,
   wherein the coolant outlet tube extends horizontally toward the second heat sink and is bent downwards at a point adjacent to the second heat sink.

7. The heat sink according to claim 5,
   wherein the coolant inflow tube extends horizontally toward the first heat sink and is bent downwards at a point adjacent to the first heat sink.

8. A battery module comprising:
   a cell assembly including at least one unit cell; and
   a heat sink according to claim 3 coupled to the cell assembly.

* * * * *